May 16, 1944.  S. G. WINGQUIST  2,349,030
UNIVERSAL JOINT
Filed Sept. 28, 1940  4 Sheets-Sheet 1

Inventor,
S. G. Wingquist
By: Glascock Downing & Seebold
Attys.

May 16, 1944.    S. G. WINGQUIST    2,349,030
UNIVERSAL JOINT
Filed Sept. 28, 1940    4 Sheets-Sheet 2

May 16, 1944.　　　S. G. WINGQUIST　　　2,349,030
UNIVERSAL JOINT
Filed Sept. 28, 1940　　　4 Sheets-Sheet 3

Inventor
S. G. Wingquist
By: Glascock Downing & Seebold
Attys.

May 16, 1944.   S. G. WINGQUIST   2,349,030
UNIVERSAL JOINT
Filed Sept. 28, 1940   4 Sheets-Sheet 4

Patented May 16, 1944

2,349,030

UNITED STATES PATENT OFFICE 2,349,030

UNIVERSAL JOINT

Sven Gustaf Wingquist, Remningstorp, Skara, Sweden

Application September 28, 1940, Serial No. 358,921
In Sweden July 16, 1940

3 Claims. (Cl. 64—21)

The present invention relates to universal joints according to my pending application Serial No. 272,657, filed May 9, 1939, comprising a driving and a driven joint member having diametrically opposed races, between which a rigid transmission member is arranged having roller bodies bearing against the races and having further firmly interconnected bevelled toothed elements meshing with corresponding toothed elements on the joint members so as to keep the joint members together axially.

An object of the invention is to provide a universal joint of the above mentioned kind suitable for power transmission in both directions of rotation wherein the joint members are provided with two further pairs of diametrically opposed races displaced at an angle of 90° with respect to the above mentioned races and having roller bodies between them, all races being made convex in the direction of rolling of the roller bodies in such manner as to provide for a permanent contact between the roller bodies and the races at all occurring angles of deflection between the axes of the driving and the driven members in spite of the non-uniformity with respect to the angular speeds of the driving and driven members.

If the roller bodies are conical having the apex located at the center of deflection of the joint, also the races are made as parts of conical surfaces having the apex located at the center of deflection and having a generatrix-angle, which is less than $90°-\alpha$ and greater than $45°-\alpha$, where $\alpha$ is the generatrix-angle of the roller body.

Preferably, the roller bodies mesh with the corresponding joint arms by means of toothed elements, the toothed elements of the opposite roller of at least one of the pairs of rollers being rigidly connected to each other, so that the joint members will be held together axially by means of the said toothed elements of the roller bodies and the joint arms only. To the same end a separate toothed element independent of the roller bodies may be provided.

Figure 1:
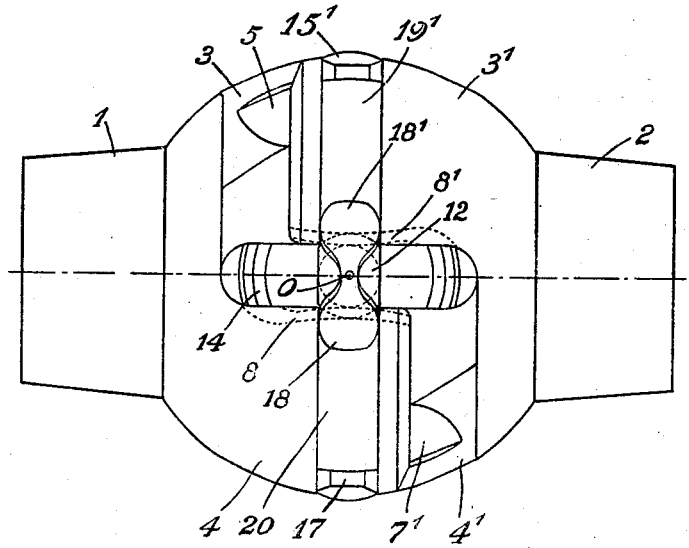
Figure 2:
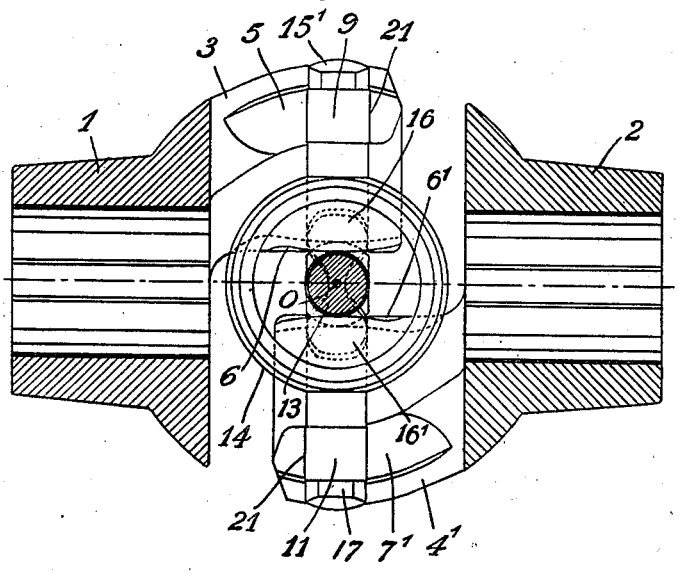
Figure 3:
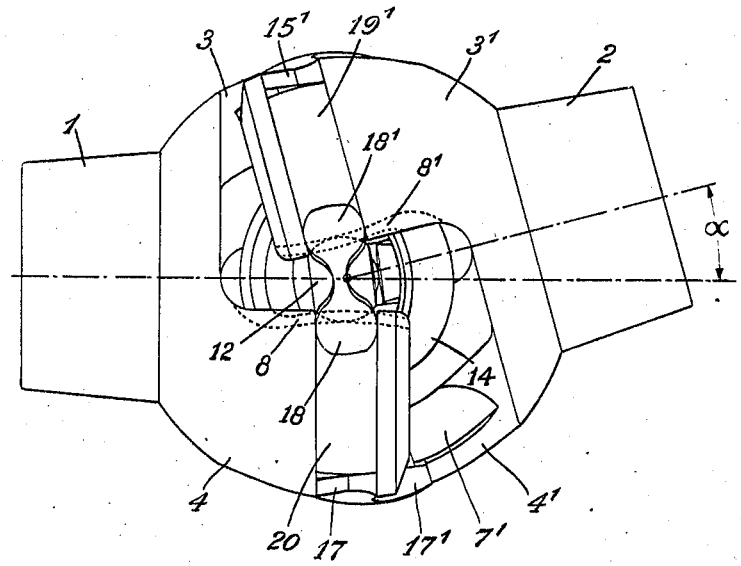
Figure 4:
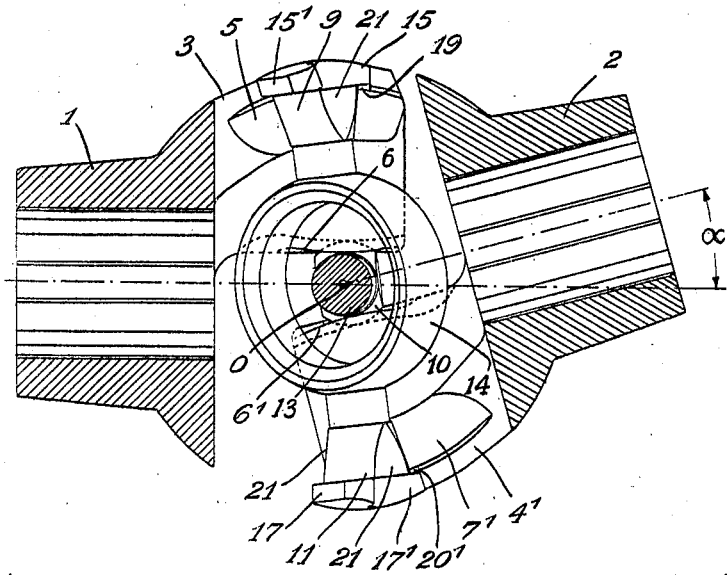
Figure 5:
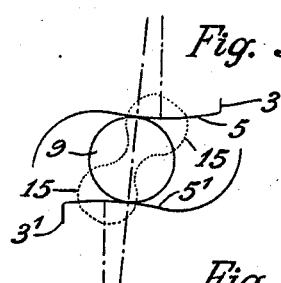
Figure 6:
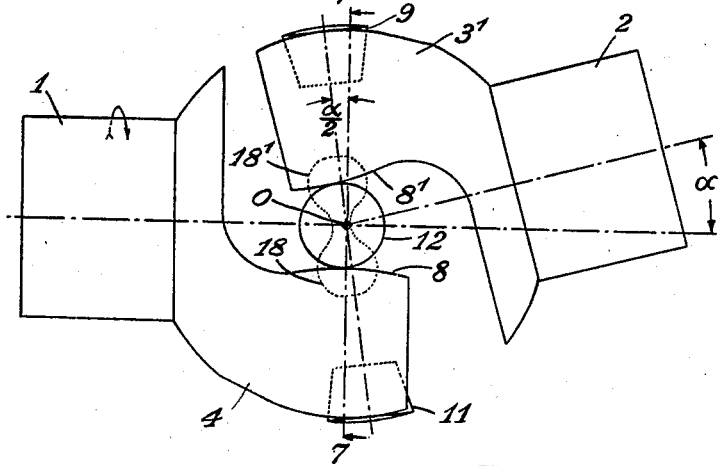
Figure 7:
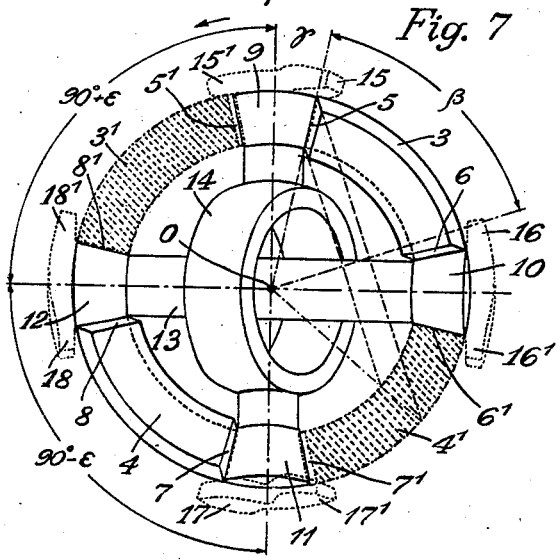
Figure 8:
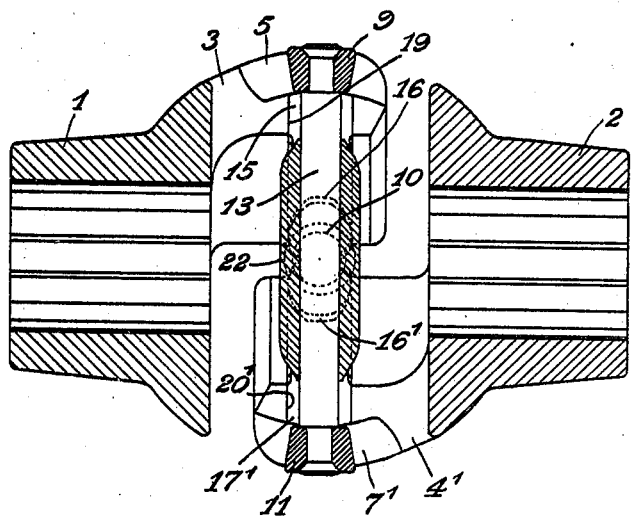

In the annexed drawings some embodiments of a universal joint according to this invention are shown. Fig. 1 is a side elevation of the joint according to one embodiment with the joint members lying co-axially, and Fig. 2 is an axial section of the same taken in the plane of the drawings. Fig. 3 is a side elevation of the same joint with the axes in a deflected position, and Fig. 4 is an axial section of the joint members in the same position. Fig. 5, 6 and 7 are diagrammatic views, showing the positions of the roller bodies at a deflected location of the joint members. Fig. 8 is an axial section and Fig. 9 a cross-section of a joint according to a modified arrangement.

In the embodiment according to Figs. 1 to 7, 1 denotes the driving joint member and 2 the driven joint member. Each of said members is provided with two diametrically opposed arms or claws 3, 4 and $3^1$, $4^1$, respectively, provided at both sides with races 5, 6 and 7, 8 and $5^1$, $6^1$ and $6^1$, $7^1$, respectively. Placed between the opposite races $5—5^1$, $6—6^1$, $7—7^1$ and $8—8^1$ of the joint arms are conical roller bodies 9, 10, 11 and 12, respectively, having the apex of the cone located in the centre of deflection 0 of the joint. The oppositely located roller bodies 10—12 and 9—11, respectively, are connected to each other by pairs by means of a rectilinear shaft 13 and an annulus 14, respectively, surrounding said shaft and form two transmission members crossing each other, the one member 9, 11, 14 taking up the thrust at the running in the one direction (forwards) and the second 10, 12, 13 at the running in the opposite direction (backwards). The annulus 14 permits of a sufficient clearness for rolling movements of the transmission member 10, 12, 13 at the running with deflected joint axes without any risk of contacting of the shaft 13 with the other transmission member 9, 11, 14, the magnitude of the rolling movement and, thus, the size of the diameter of the annulus being determined by the greatest occurring angle of deflection of the axes of joint members.

In order to assure of a perfect rolling of the roller bodies on the races and in order to keep the joint members together axially the four roller bodies 9 to 12 are each provided with two teeth $15—15^1$, $16—16^1$, $17—17^1$ and $18—18^1$, respectively, which mesh with corresponding tooth spaces 19, $19^1$ and 20, $20^1$ in the arms of the joint members.

The axial holding together of the joint member is hereby effected by this that, when an axial pull or thrust is exerted on said members, the toothed elements will be exposed to power moments, which counteract each other.

The races 5, 6, 7, 8 and $5^1$, $6^1$, $7^1$, $8^1$, respectively, of the joint arms are made circularly around the centre of deflection 0 of the joint (compare the races 5 and $7^1$ in Figs. 2 and 4) and shall besides, as will be more particularly described below, be so shaped in the direction of rolling of the roller bodies that at the deflection of the axes of the joint members and the rolling of the rolling bodies caused thereby no squeezing occurs between said bodies and the races, but a free rolling is assured, and also so that the transmission member, which at a certain direction of rolling does not transmit any power and which also performs a rolling motion, in each position obtains a space without any play or with the least possible play in spite of the non-uniformity with respect to the angular speeds of the driving and the driven joint members.

This is illustrated in the diagrammatical Figures 5 to 7, which show the positions of roller bodies between the races, when the axes of the joint members 1 and 2 are deflected about an angle $\alpha$, as in Figs. 3 and 4. Here, the tooth spaces in the joint members are not shown, which, however, is the case with the toothed elements 15—15$^1$, 16—16$^1$, 17—17$^1$ and 18—18$^1$ of the transmission members, which are indicated by dotted lines.

At the deflection of the joint members about the said angle the roller bodies 9, 11 and 10, 12, respectively, of the transmission members will roll between the related races until their axes have turned around the centre of deflection 0 of the joint about an angle $$\frac{\alpha}{2}$$

from their initial positions (those shown in Figs. 1 and 2). If the driving joint member 1 rotates in the direction of the arrow shown in Figs. 6 and 7, the transmitting member 9, 11, 14 being then power transmitting, the races 5, 5$^1$ and 7, 7$^1$, respectively, will approach at the said deflecting movement due to the convex shape of the races in the direction of rolling. As to the races 5, 5$^1$ this is illustrated in Fig. 5.

At the direction of drive mentioned the second transmission member 10, 12, 13 is unloaded and thus to be considered as not power transmitting. However, at the relative deflecting movement of the joint members about the angle shown also said second transmission member obtains a rolling motion between its races, as visible from the roller body 12 and its races 8, 8$^1$ in Fig. 6. By the turning of the axis of the transmission member about the centre of deflection 0 out of the central position (Figs. 1 and 2) the races 8, 8$^1$ and also the races 6, 6$^1$ will deviate from each other. By a suitable accommodation of the convex shape of the races in the direction of rolling the angular measure corresponding to the approaching of the races 5, 5$^1$ and 7, 7$^1$, respectively, may be made equal to the deviating of the races 8, 8$^1$ and 6, 6$^1$, respectively, or, in other words, by suitably shaping the races it is possible to maintain contact between the roller bodies and the relating races while avoiding squeezing of the roller bodies 9 and 11 between the races 5, 5$^1$ and 7, 7$^1$, respectively, and play between the roller bodies 10, 12 and the relating races 6, 6$^1$ and 8, 8$^1$, respectively, in spite of the non-uniformity with respect to the angular speeds of the driving and the driven joint members due to the deviating movement of the transmission members out of the bisectrix-plane.

In Fig. 7, which is a cross-section along the line 7—7 in Fig. 6, there is shown at the race 5 by a dotted line the outline of the roller body 9 in its position beyond the ridge of the said race, while the ridge of the race 5$^1$ is shown by a dotted line beyond the corresponding outline of the roller body 9 (compare Fig. 5). The position of the opposite roller body 11 with relation to its races 7, 7$^1$ is illustrated in a similar manner, though with the difference that the relation is inverted, so that the outline of the roller body 11 is visible ahead of the ridge of the race 7. Thus, the axis of the roller body 9 has approached the race 5 about a certain angle $\epsilon$, and also the race 7$^1$ has approached the race 7 about the same angle, so that the angle to the axis of the intermediate roller body has changed from 90° to 90°+$\epsilon$. Then, the race 5$^1$ has approached the race 5 about the angle 2$\epsilon$, which will correspond to the angular measure, with which the races 8, 8$^1$ and 6, 6$^1$, respectively, have deviated at the rolling of the roller body 12 and the roller body 10, respectively. As mentioned above, this is accomplished by making the races convex in the direction of rolling in a suitable manner. For roller bodies, which are conical and have the apex located in the centre of deflection 0 of the joint, also the races form part of conical surfaces also having the apices located in the centre of deflection and having a generatrix-angle $\beta$, which is less than 90°—$\gamma$ and greater than 45°—$\gamma$, where $\gamma$ is the generatrix-angle of the roller body.

In order to facilitate the mounting and dismounting of the joint, the roller bodies are flattened at two diametrically opposite sides 21, which are not required for the rolling, as apparent from Figs. 2 and 4.

The dismounting is performed in such manner that the joint members 1 and 2 are deflected out of the position shown in Fig. 1 in the direction perpendicular to the plane of the drawings about such a great angle that the shaft-shaped transmission member 10, 12, 13 with its teeth 16, 16$^1$ and 18, 18$^1$ gets out of mesh with the tooth spaces in the joint members. Hereby, the transmission member will be free to be turned about 90° from the position shown in Figs. 1 and 2. Due to the flattened portions 21 it will be possible to pull out the released transmission member through the space between the arms 3, 4$^1$ and 3$^1$, 4 of the joint members and through the annulus 14 of the second transmission member. Then, the joint members can easily be disjointed from the last mentioned transmission member. The mounting is performed in the reversed order, so that the annular transmission member first is placed into position and the shaft-shaped transmission member is inserted and turned into mesh with the tooth spaces.

Figure 9:
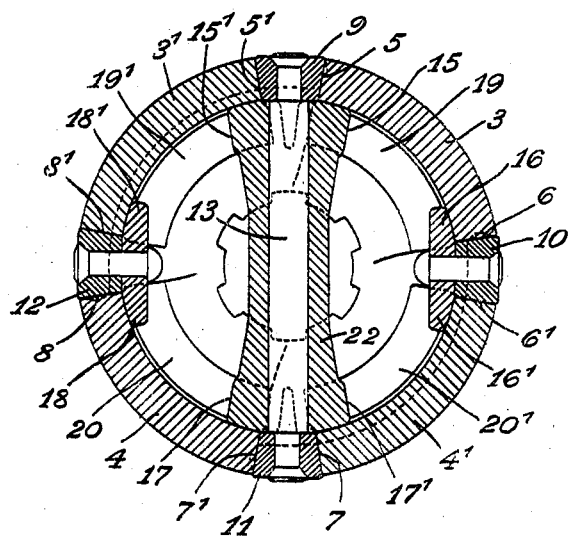

Figs. 8 and 9 show an embodiment of a joint according to the invention, which differs from the embodiment according to Figs. 1 to 7 essentially in this respect that one pair only of the opposite rollers with the relating toothed elements, i. e. the rollers 9 and 11 adopted for forward running with the relating toothed elements 15, 15$^1$ and 17, 17$^1$, respectively, forms a rigid transmission member, whereas the two other opposite rollers 10, 12 are made as separate members and provided with toothed elements 16, 16$^1$ and 18, 18$^1$, respectively, secured by riveting.

The toothed elements 15, 15$^1$ and 17, 17$^1$ are made at the opposite ends of a diametrically disposed sleeve 22, through which the shaft 13$^1$ is inserted, at the ends of which the rollers 9 and 11 are secured by riveting.

As in the embodiment according to Figs. 1 to 7, the toothed elements are adapted to mesh with corresponding tooth spaces made in the arms 3, 3$^1$ and 4, 4$^1$ of the joint members and provided with parallel sides to form circular slots 19, 19$^1$, 20, 20¹. Besides, the races 5, 5¹, 6, 6¹, 7, 7¹ and 8, 8¹ are to be curved in the direction of rolling in the same manner as described above. The axial holding together of the joint members is here effected by means of the toothed sleeve 22, while the free toothed elements 16, 16¹ and 18, 18¹ have no similar effect, but have for their object only to guide the rollers 10 and 12, respectively, at their rolling motion.

The mounting of this joint is performed in such manner that first the sleeve 22 is inserted between the joint members and then the free rollers 10 and 12 with their relating toothed elements 16, 16¹ and 18, 18¹. Then the shaft 13¹ is inserted through the sleeve 22 and the rollers 9 and 11 are applied and secured by riveting. This joint is not adapted to be dismounted.

A great advantage of a joint according to the present invention is that the non-uniformity, i. e. the difference of the angular speeds of the driving and the driven joint member, can be chosen differently solely by choosing the relation between the radius of the roller bodies and that of the races differently. If for instance the said relation be chosen equal to ⅙, the non-uniformity will be ⅓ only of the non-uniformity in an ordinary Cardan joint. However, the said relation can be chosen differently within wide limits.

What I claim as new and desire to secure by Letters Patent of the United States of America is:

1. A universal joint having one center of deflection comprising, a driving member, a driven member, substantially diametrically opposed pairs of races on said members, toothed elements on each of said members, a rigid transmission member between said driving and driven member, roller bodies on said transmission member bearing against said races, firmly interconnected toothed elements on said transmission member meshing with said toothed elements on the driving and driven member respectively, two further pairs of substantially diametrically opposed races on said driving and driven members displaced at an angle of about 90° with respect to said first mentioned pairs of races, roller bodies between said latter pairs of races, all races being made convex in the direction of rolling of the roller bodies to provide for a permanent contact between the roller bodies and the races at all occurring angles of deflection between the axes of said driving and driven members in spite of the non-uniformity with respect to the angular speeds of said driving and driven members.

2. A universal joint having one center of deflection comprising, a driving member, a driven member, substantially diametrically opposed pairs of conical races on said members having their apices located at the center of deflection of the joint, toothed elements on each of said members, a rigid transmission member between said driving and driven member, conical roller bodies on said transmission member having their apices located at said center of deflection and bearing against said races, firmly interconnected toothed elements on said transmission member meshing with said toothed elements on the driving and driven member respectively, two further pairs of substantially diametrically opposed conical races on said driving and driven members displaced at an angle of about 90° with respect to said first mentioned pairs of races and having their apices located at said center of deflection, conical rollers between said latter pairs of races having their apices located at said center of deflection, and the generatrix-angle of said conical races being less than 90° −α and greater than 45° −α, where α is the generatrix-angle of said conical roller bodies.

3. A universal joint comprising a driving and a driven element each provided with a plurality of axially extending projections, a plurality of rotary bodies interposed between said projections to form therewith a ring, a rotatable cross shaft having its axis passing through the center of the joint for rigidly connecting two of said bodies to each other, two relatively non-rotatable sets of equispaced tooth elements on said cross shaft disposed in two parallel planes perpendicular to the axis of said cross shaft, and a plurality of tooth elements on the adjoining projections in mesh with said first tooth elements.

SVEN GUSTAF WINGQUIST.